Patented May 17, 1949

2,470,555

UNITED STATES PATENT OFFICE 2,470,555

FORMALDEHYDE CONDENSATION PRODUCTS OF MERCAPTANS AND PROCESS FOR MAKING SAME

Marion W. Harman, Nitro, W. Va., assignor to Monsanto Chemical Company, St. Louis, Mo., a corporation of Delaware No Drawing. Application October 9, 1945, Serial No. 621,387

6 Claims. (Cl. 260—306.6)

The present invention relates to new chemical compounds and to the process of their preparation.

The compounds of the present invention comprise reaction products of organic mercaptans with formaldehyde and ammonia. While mercaptans have been combined with formaldehyde and ammonia before, the compounds of this invention contain these reactants in a different ratio than in the compounds heretofore produced. Thus, the ammonium salt of mercaptobenzothiozole is known to react with formaldehyde, presumably producing a compound of the structure

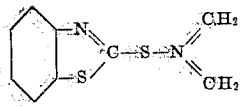

Similarly tris(mercaptomethyl) amines, i. e. compounds of the general structure $(R-SCH_2)_3N$ where R is an organic radical, are known. The new compounds are reaction products of mercaptans, formaldehyde and ammonia containing more than one molecular proportion of formaldehyde and less than one molecular proportion of ammonia combined with each molecular proportion of the mercaptan.

In accordance with the present invention it has been found that organic mercaptans condense in aqueous medium with ammonia and formaldehyde in substantial excess of the molecular proportion of the mercaptan to produce valuable products. The reaction is conducted with the free mercaptans although it is preferable to add a small amount of alkali sufficient to render the charge slightly alkaline in the absence of the ammonia.

Typical examples of mercaptans which may be reacted with formaldehyde and ammonia comprise butyl mercaptan, amyl mercaptan, lauryl mercaptan, thio phenol, thio beta naphthol, 2-mercapto-4-methyl thiazole, 2-mercapto naphtho thiazole, 2-mercapto-6-nitro benzothiazole, 2-mercapto-5-chlor benzothiazole, 2-mercapto-4-methyl benzothiazole, 2-mercapto-4-phenyl benzo-thiazole, 2-mercapto-4-ethyl thiazole, 2-mercaptobenzothiazole, and 2-mercapto thiazoline.

The new products of this invention are believed to be formed in accordance with the general equation $3R-SH + 6HCHO + NH_3 \rightarrow (R-S)_3C_6H_{10}O_2N + 4H_2O$ where R represents an organic radical.

The reactions are best effected in aqueous medium since organic solvents seem to favor the formation of by-products which do not contain the high proportion of formaldehyde constituent characteristic of the new compounds. The following example illustrates the preparation of one of the new compounds but is not limitative of the invention.

Example

Into a container of suitable capacity fitted with an efficient stirrer and reflux condenser there was charged 206 parts by weight (substantially 1.2 molecular proportions) of finely powdered mercaptobenzothiazole, 164 parts by weight (substantially 2 molecular proportions) of 37% formaldehyde and 1000 parts by weight of water. The mixture was stirred until a thin slurry was formed, then about 1 part by weight of soda ash added or enough to render the charge slightly alkaline, followed by 28 parts by weight (substantially 0.46 molecular proportion) of ammonium hydroxide sp. g. 0.90 diluted with 100 parts by weight of water. The addition of the ammonia brought about a slight exothermic reaction. The mass was stirred and slowly heated up to 90° C. over a period of about three hours. Heating and stirring was then continued at 90–95° for 5 to 20 hours and the mass filtered hot. Excellent yields were obtained over this entire range of heating periods and only slight improvements were noticeable upon heating longer than five hours. The pale yellow fine crystalline product was washed with water and dried at 70° C. The crude product softened at about 210° and melted with decomposition at 223–226° C. It was slightly soluble or insoluble in all common solvents except chlorobenzene and o-dichlor benzene from which it could be recrystallized. After two recrystallizations the purified product melted at 233–235° C. Analysis of the pure product gave the following:

|  | Found | Calculated for $C_{27}H_{22}O_2N_4S_6$ |
|---|---|---|
| Carbon | 51.57 | 51.53 |
| Hydrogen | 3.24 | 3.53 |
| Nitrogen | 8.87 | 8.94 |
| Sulfur | 30.64 | 30.69 |
| Oxygen (by diff.) | 5.68 | 5.31 |

The product is therefore believed to be formed in accordance with the following equation:

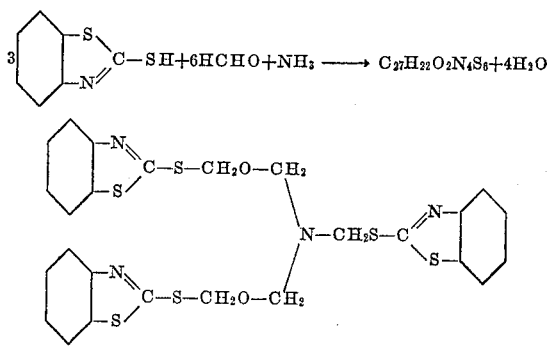

The results are not affected by minor variations in the proportion of formaldehyde. The proportions in the foregoing example correspond to five mols of formaldehyde with three mols of mercaptobenzothiazole although the ratio in which they react is six to three. When the ratio of formaldehyde is increased the identical product is obtained. Thus, increasing the ratio of formaldehyde to seven mols per three of mercaptobenzothiazole the identical product was obtained and in substantially the same yield.

The new products of this invention are useful for accelerating the vulcanization of rubber and for treating tire cord to improve the adhesion of the cord to the rubber and for other uses. This invention is limited solely by the claims attached hereto as part of the present specification.

This application is a continuation-in-part of co-pending application Serial No. 566,950, filed December 1, 1944.

What is claimed is:

1. The process which comprises heating three molecular proportions of a mercapto thiazole with at least five molecular proportions of formaldehyde and approximately one molecular proportion of ammonia in aqueous medium producing a condensation product of said reactants which contains at least 5 but less than 7 molecular proportions of formaldehyde combined with 3 molecular proportions of said mercapto thiazole, sulfur and nitrogen atoms in the ratio of 3:2 and oxygen, with the elimination of water as a by-product of the condensation.

2. The process which comprises heating three molecular proportions of a mercapto arylene thiazole with at least five molecular proportions of formaldehyde and approximately one molecular proportion of ammonia in aqueous medium producing a condensation product of said reactants which contains at least 5 but less than 7 molecular proportions of formaldehyde combined with 3 molecular proportions of said mercapto arylene thiazole, sulfur and nitrogen atoms in the ratio of 3:2 and oxygen, with the elimination of water as a by-product of the condensation.

3. The process which comprises heating at about 90–95° C. three molecular proportions of mercaptobenzothiazole with at least five molecular proportions of formaldehyde and approximately one molecular proportion of ammonia in aqueous medium producing a condensation product of said reactants which contains at least 5 but less than 7 molecular proportions of formaldehyde combined with 3 molecular proportions of mercaptobenzothiazole, sulfur and nitrogen atoms in the ratio of 3:2 and oxygen, with the elimination of water as a by-product of the condensation.

4. As a new composition of matter the product obtained by heating, with the elimination of water, 3 molecular proportions of a mercapto thiazole with at least 5 molecular proportions of formaldehyde and approximately 1 molecular proportion of ammonia in an aqueous medium, said reaction product containing at least 5 but not more than 7 molecular proportions of formaldehyde combined with 3 molecular proportions of said mercapto thiazole, sulfur and nitrogen atoms in the ratio of 3:2 and oxygen.

5. As a new composition of matter the product obtained by heating, with the elimination of water, 3 molecular proportions of a mercapto arylene thiazole with at least 5 molecular proportions of formaldehyde and approximately 1 molecular proportion of ammonia in an aqueous medium, said reaction product containing at least 5 but not more than 7 molecular proportions of formaldehyde combined with 3 molecular proportions of said mercapto arylene thiazole, sulfur and nitrogen in the ratio of 3:2 and oxygen.

6. As a new composition of matter the product obtained by heating, with the elimination of water, 3 molecular proportions of mercaptobenzothiazole with at least 5 molecular proportions of formaldehyde and approximately 1 molecular proportion of ammonia in an aqueous medium, said reaction product containing at least 5 but not more than 7 mols of formaldehyde combined with 3 mols of mercaptobenzothiazole, sulfur and nitrogen atoms in the ratio of 3:2 and oxygen.

MARION W. HARMAN.

REFERENCES CITED

The following references are of record in the file of this patent:

UNITED STATES PATENTS

| Number | Name | Date |
|---|---|---|
| 1,779,715 | Scott | Oct. 28, 1930 |
| 2,338,864 | Mathes | Jan. 11, 1944 |

Certificate of Correction

Patent No. 2,470,555.

May 17, 1949.

MARION W. HARMAN

It is hereby certified that error appears in the printed specification of the above numbered patent requiring correction as follows:

Column 3, lines 8 to 17 inclusive, strike out the structure reading:

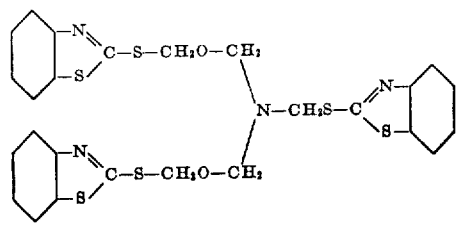

and that the said Letters Patent should be read with this correction therein that the same may conform to the record of the case in the Patent Office.

Signed and sealed this 25th day of October, A. D. 1949.

[SEAL]

THOMAS F. MURPHY,
*Assistant Commissioner of Patents.*